Sept. 15, 1925.
R. J. HUTCHINSON
AUTOMOBILE SPRING
Filed March 3, 1923
1,553,535
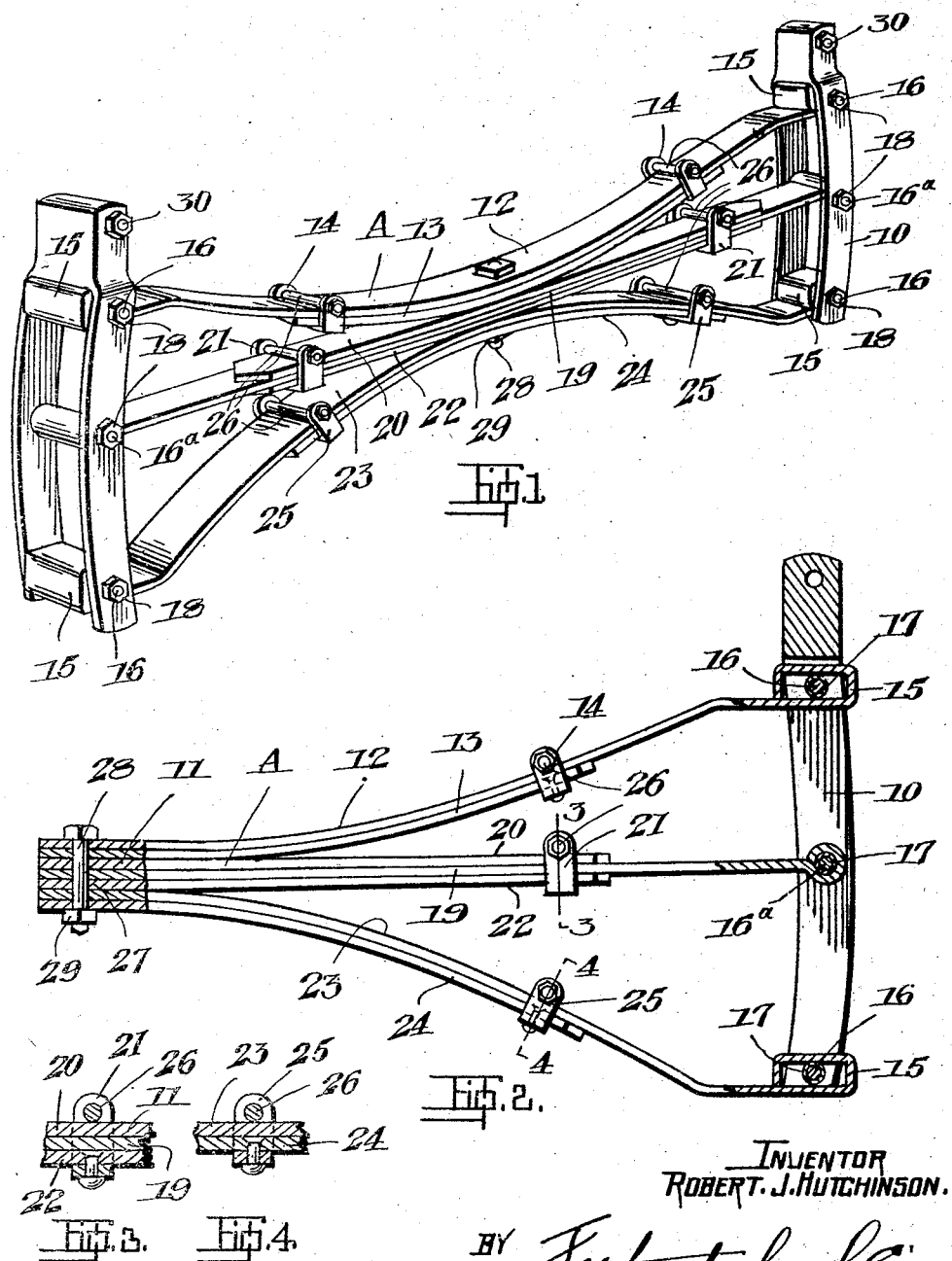
INVENTOR
ROBERT. J. HUTCHINSON.
BY Fetherstonhaugh & Co.
ATTYS.

Patented Sept. 15, 1925.

1,553,535

UNITED STATES PATENT OFFICE.

ROBERT JAMES HUTCHINSON, OF ST. JOHN, NEW BRUNSWICK, CANADA.

AUTOMOBILE SPRING.

Application filed March 3, 1923. Serial No. 622,708.

*To all whom it may concern:*

Be it known that I, ROBERT JAMES HUTCHINSON, a subject of the King of Great Britain, and resident of the city of St. John, in the Province of New Brunswick and Dominion of Canada, have invented certain new and useful Improvements in Automobile Springs, of which the following is a specification.

This invention relates to improvements in automobile springs and the objects of the invention are to minimize, in automobiles and similar vehicles, the rebound and to overcome shock.

Further objects are the provision of a spring of this class which can be fitted to an automobile and which enables the latter to comfortably negotiate bumps and uneven surfaces generally.

With these and other objects in view, the invention consists essentially in the novel construction and arrangement of parts described in the present specification and illustrated by the accompanying drawings that form part of the same.

Referring to the drawings in which like characters of reference indicate corresponding parts in each figure, Figure 1 is an enlarged perspective view.

Figure 2 is a vertical section through one half of the spring.

Figure 3 is a section on line 3—3, Figure 2.

Figure 4 is a section on line 4—4, Figure 2.

In the drawings, A represents the spring as a whole, comprising suitable supporting brackets 10 at each end designed to support a plurality of leaves 11. These leaves comprise a top leaf 12 substantially bow shaped and arranged with the bowed portion extending downwardly. 13 is a reinforcing leaf adapted to fit the top leaf 12 and fastened thereto by suitable clamps 14.

15 are sockets formed in the ends of the leaves by bending the individual ends of the leaves over on themselves and are designed to engage with suitable securing bolts 16 provided with bushings 17 and extending through the brackets 10 and screw threaded to receive securing nuts 18.

19 is the middle leaf adapted to support most of the load. This leaf is also slightly bowed and is fastened to the bracket 10 by suitable bolts 16ª. 20 and 22 are top and bottom reinforcing leaves for the middle leaf 19, clamped thereon by suitable clamps 21.

23 is the bottom leaf similarly bowed to the leaf 12 and similarly secured at the ends in the brackets 10 and so arranged that the bowed portion forms an upwardly extending arch. The lower leaf 23 is also provided with a reinforcing leaf 24 similarly clamped thereon at 25 to the reinforcing leaf 13 on the top leaf 12. The clamping members are provided with suitable rivets 26.

The front bracket of the car is secured in such a manner as to prevent any movement of the bracket itself while at the same time allowing the top and bottom leaves of the spring to move in the slots provided therefor and this can be done in any suitable or convenient manner.

It will be seen from the foregoing that the spring leaves are so arranged in the brackets 10 that they all contact at the centre 27 and where they are fixedly secured together by means of a king bolt 28 screw threaded at one end to receive the lock nut 29. This bolt 28 can also be used for fastening the spring to the car axle as well as holding the leaves in place. By means of the brackets 10 and the bolts 30 the spring is fastened to the spring shackles of a car.

In operation, the action of the springs is as follows:

When the natural load of the car is supported, the middle leaf 19, made as mentioned with a slight bow, assumes a horizontal position and when the extra load is applied, as when the car rides over bumps or the like, leaf 19 bends up or down as the pressure or shock is brought to bear and leaves 12 and 23 work with it; that is if leaf 19 bends so that the bowed portion forms an upwardly extending arch, leaf 12 would tend to straighten and the ends move outward in the brackets 10, the slots in ends of leaf 12 permitting free movement. At the same time leaf 23 would tend to bow more and the ends move inwards in the brackets 10. When the leaf 19 bends so that it forms a downwardly extending arch, leaves 12 and 23 assume the reverse position to those described above.

It will thus be seen that my improved spring affords a very great amount of resiliency, due to the construction of the slotted leaf ends in combination with the securing and supporting brackets, whereby, with the oppositely bowed and central reinforced springs joined together in the centres, the greatest possible amount of play is allowed in operation.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A vehicle spring or the like, comprising a centre spring, an upper spring and a lower spring, all secured together at substantially one securing point, a bracket, centre, upper and lower securing bolts rigidly fixed in the bracket, the centre spring being connected to the centre securing bolt by a close fitting connection, the upper and lower springs being formed with sockets forming a sliding connection with the upper and lower securing bolts respectively, means for pivotally securing the brackets to the shackles of the vehicle.

2. A vehicle spring as claimed in claim 1, having the spring double ended, and the securing point being at substantially the centre.

3. A vehicle spring as claimed in claim 1, having the springs double ended, and the securing point being at substantially the centre, each spring secured to the pivoted bracket at each end, and each spring connected to each bracket by a similar connection at both ends.

4. A vehicle spring as claimed in claim 1, in which the centre spring in normal position is substantially flat, and the upper and lower springs are bowed therefrom.

5. A vehicle spring as claimed in claim 1, in which the centre springs are substantially flat, and the upper and lower springs bowed therefrom, having springs double-ended, and the securing point being at substantially the centre, each spring secured to the pivoted bracket at each end, and each spring connected to each bracket by a similar connection at both ends.

In witness whereof I have hereunto set my hand.

ROBERT JAMES HUTCHINSON.